(12) United States Patent
Cox, IV

(10) Patent No.: US 8,534,608 B1
(45) Date of Patent: Sep. 17, 2013

(54) AERIAL EMERGENCY LOAD RELEASE MECHANISM

(76) Inventor: William Cleveland Cox, IV, N. Myrtle Beach, NC (US)

( * ) Notice: Subject to any disclaimer, the term of this patent is extended or adjusted under 35 U.S.C. 154(b) by 0 days.

(21) Appl. No.: 13/602,748

(22) Filed: Sep. 4, 2012

(51) Int. Cl.
*B64D 1/00* (2006.01)
*B64D 1/12* (2006.01)
*A01G 3/00* (2006.01)
*A01G 3/04* (2006.01)
*A01G 3/08* (2006.01)

(52) U.S. Cl.
USPC .................... 244/137.4; 244/118.1

(58) Field of Classification Search
USPC ............... 244/137.4, 137.1, 118.1, 127, 147, 244/151 B, 1 TD, 17.11; 56/235, 8, DIG. 9; 294/82.26, 82.24; 144/335, 353, 24.13
See application file for complete search history.

(56) References Cited

U.S. PATENT DOCUMENTS

| | | | |
|---|---|---|---|
| 3,688,952 A * | 9/1972 | Barlow et al. | 244/136 |
| 4,815,263 A | 3/1989 | Hartung et al. | |
| 4,984,757 A | 1/1991 | Hartung et al. | |
| 5,417,304 A * | 5/1995 | Kurtgis | 244/137.4 |
| 5,850,991 A | 12/1998 | Hainsworth et al. | |
| 5,961,070 A | 10/1999 | Bradford et al. | |

* cited by examiner

*Primary Examiner* — Tien Dinh
*Assistant Examiner* — Richard R Green
(74) *Attorney, Agent, or Firm* — MacCord Mason PLLC

(57) ABSTRACT

An airborne tree trimming system is described that includes a helicopter having a chassis and a frame extending beneath the helicopter chassis; a trimming apparatus including a boom with an upper end and a plurality of rotatable cutting blades mounted on the boom; and a release mechanism attaching the trimming apparatus to the helicopter, the release mechanism including a connector having an upper end with a first hook attachment point, a lower end with a boom attachment point, and a second hook attachment point intermediate the upper and lower end; a first release hook mounted on the helicopter chassis and releasably attachable to the first hook attachment point; and a second release lock mounted on the frame and releasably attachable to the second hook attachment point.

20 Claims, 2 Drawing Sheets

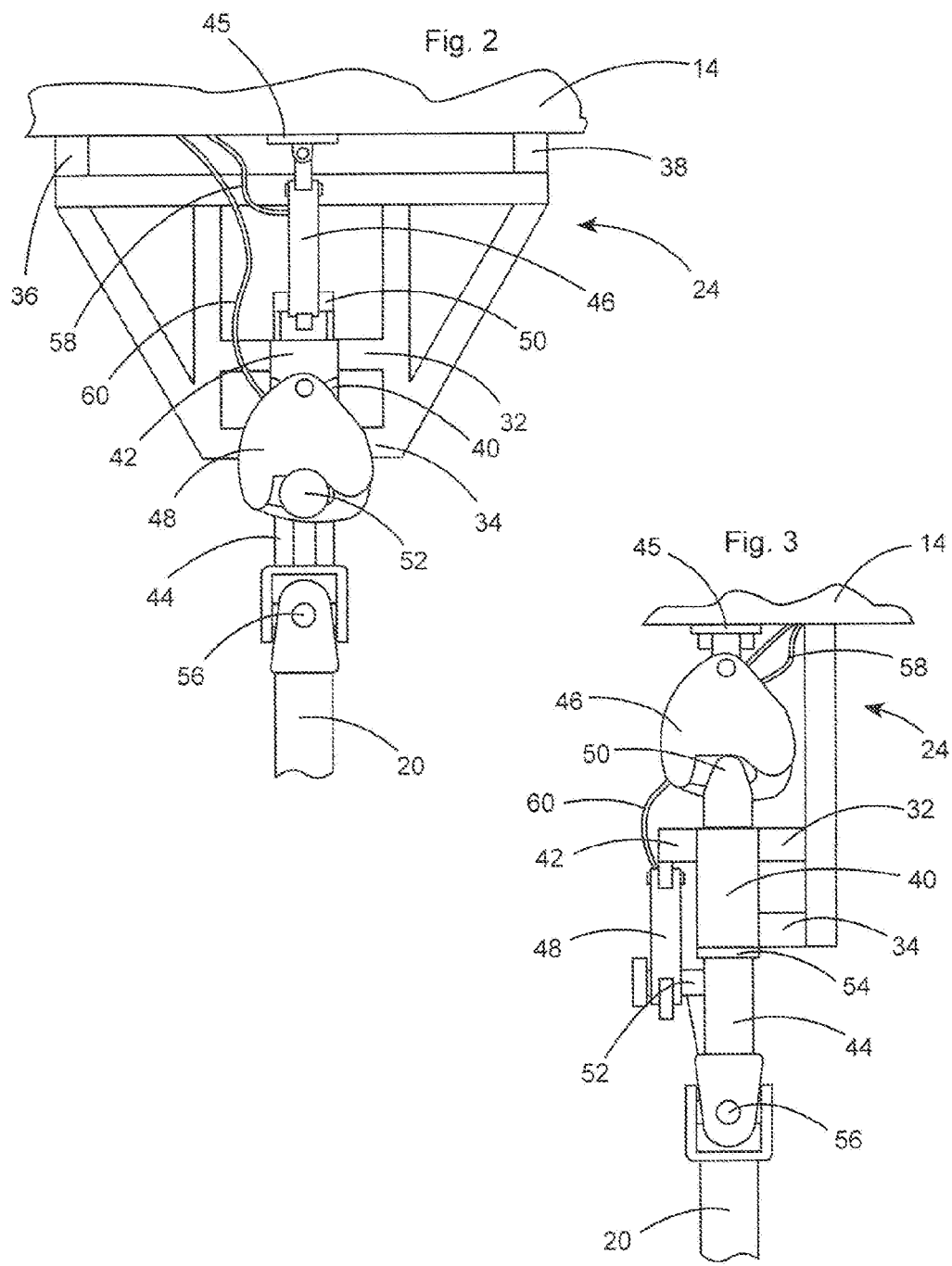

AERIAL EMERGENCY LOAD RELEASE MECHANISM

BACKGROUND OF THE INVENTION (1) Field of the Invention

The present invention relates to an emergency release mechanism for jettisoning an external load supported beneath a helicopter, and in particular to an emergency release mechanism for jettisoning a tree trimming apparatus from a helicopter if the trimming apparatus becomes entangled in trees or other material preventing movement of the helicopter.

(2) Description of the Prior Art

It is known to trim tree limbs and other vegetation alongside power lines using an airborne system comprised of a helicopter having a trimming apparatus suspended beneath the helicopter. Systems used for this purpose are described, for example, in U.S. Pat. Nos. 4,815,263 and 4,984,757. Helicopters are also used to carry other external loads such as cargo, water containers, vehicles, etc., suspended on an attachment member, such as a cable, extending downwardly beneath the helicopter. As used herein, the term "load" is used to generally refer to cargo, trimming apparatus and other objects transported while suspended beneath a helicopter.

One risk in transporting a load beneath a helicopter is that the load can become entangled in vegetation or other objects on the ground, halting movement of the helicopter. Depending on the terrain, the helicopter may be prevented from landing, which can result in the helicopter crashing, causing damage to the helicopter and more importantly, injury or even death to the pilot. Helicopter malfunctions and other emergencies may also result in a need to jettison the load from the helicopter.

To address these concerns, helicopters used to transport external loads commonly include an emergency release mechanism including a quick-release hook that can be actuated by the pilot or co-pilot to separate the attachment member and supported load from the helicopter. For example, U.S. Pat. No. 4,984,757 describes a system comprised of a helicopter having a trimming apparatus attached beneath the helicopter by a release mechanism. A quick-release hook is attached to the bottom of the helicopter chassis. The trimming apparatus boom extends upwardly through a sleeve or tube socket supported on a pivotal frame, known as a trapeze frame, beneath the helicopter with the upper end of the boom being releasably attached to the hook. The hook is actuated by a lever accessible to the pilot. Upon actuation, the hook is opened and the trimming apparatus is jettisoned from the helicopter.

Quick-release hooks used for this purpose are manufactured, for example, by Onboard Systems, Vancouver, Wash. Generally, the hook is comprised of a body and a load beam moveable between open and closed positions to lock around an eye or bar on the cable, boom or other attachment member. The hook includes means to quickly and easily open the hook, such as a hydraulic, electrical or mechanical cable extending from the hook to a release handle adjacent the pilot's seat.

One of the disadvantages of a quick and easy hook release is that the pilot may inadvertently, or even intentionally in a panic situation, actuate the hook release when jettisoning of the load is not in fact required. Considerable cost can result from detaching a load from a helicopter due to lost time, damage to the load, retrieval of the load, and damage to objects struck by the load when it is dropped. Trimming apparatus dropped from a helicopter adjacent power lines can sever power lines or cause fires, resulting in loss of power for considerable periods.

Therefore, there is a need for a load jettisoning mechanism that will provide a secure attachment and allow for a quick release in an emergency, but which will minimize the likelihood of an inadvertent or panic jettisoning of the load when an emergency release is not actually required.

SUMMARY OF THE INVENTION

The present invention will be described in terms of a release mechanism for detachably securing a trimming apparatus beneath a helicopter. It will be understood, however, that a trimming apparatus is representative of loads that can be held by the release mechanism beneath a helicopter and that the present invention is applicable to use with other loads.

Generally, the release mechanism is comprised of an elongated connector or slip tube, and first and second separately actuated quick-release hooks attachable at separate points to the helicopter and to the connector. The connector includes a lower attachment point for connection of the load attachment member, e.g., a boom or cable, an upper attachment point to latch the first hook, and an intermediate attachment point to latch the second hook.

Where the load is a trimming apparatus, the trimming apparatus includes an upwardly extending boon with the lower attachment point being joined via a universal joint to the upper end of the boom. The first hook is mounted on the helicopter chassis and is latched to the first hook attachment point at the upper end of the connector.

The helicopter includes a frame or "trapeze mount" beneath the helicopter chassis, with the second hook being attached to the trapeze mount and releasably latched to the second attachment point intermediate the upper and lower ends of the connector.

Preferably, the trapeze mount includes a sleeve or slip tube socket, having a vertical conduit corresponding to the outside dimensions of the connector so that the connector is vertically slidable within the sleeve. The connector includes an outer flange or stop that limits upward movement of the connector within the sleeve.

Each hook is comprised of a body and a load beam moveable between latched and open positions. A horizontal hole extends through the top of the body for attachment of the hook. In the preferred embodiment, one hook is attached to the bottom of the helicopter chassis with a mount, and the second hook is attached to the trapeze mount sleeve.

In operation, the connector is attached to the top of the load attachment member, e.g., the boom, and inserted upwardly through the trapeze mount sleeve. The upper hook is latched to the upper end of the connector, e.g., by providing an upper horizontal latch bar at the top of the connector and latching the load beam of the hook around the upper bar. The lower hook is latched to the trapeze mount, e.g., by providing a lower horizontal latch bar intermediate the upper and lower ends of the connector and latching the load beam of the second hook around the lower bar. The load is thus secured to the helicopter by two hooks at separate locations.

In the event of an emergency, the pilot separately actuates each hook, e.g., by pulling on its respective actuation lever. If only one hook is released the load will stay attached to the helicopter by the other hook. The load is jettisoned only after opening of both hooks. Since the hooks must be separately actuated, and since the pilot must undertake separate actions to release both hooks, the likelihood that the load will be jettisoned by accident or due to sudden panic, is largely eliminated.

BRIEF DESCRIPTION OF THE DRAWINGS

FIG. 2 is a front view of the safety release mechanism.
FIG. 3 is a rear view of the safety release mechanism.

DETAILED DESCRIPTION OF THE INVENTION

Figure 1:
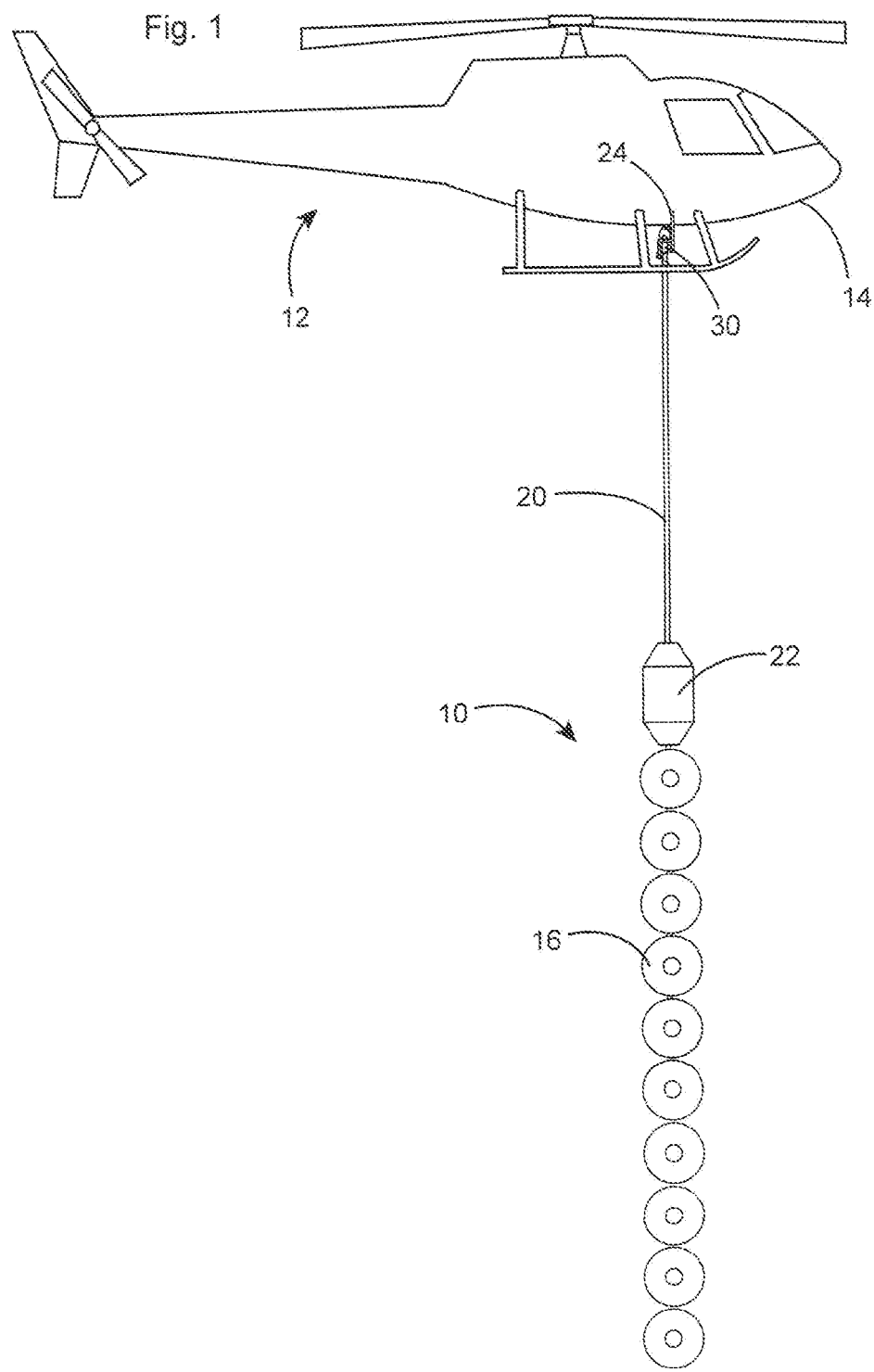
FIG. 1 illustrates a helicopter with a trimming apparatus suspended beneath the helicopter.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

FIG. 1 illustrates a preferred embodiment of the invention for use in suspending a trimming apparatus, generally 10, beneath a helicopter, generally 12, including helicopter chassis 14. Trimming apparatus 10 is comprised of a plurality of rotatable, circular saw blades 16 aligned in a vertical plane and mounted on boom 20. Blades are rotated by engine 22. A mounting frame 24, referred to herein as a trapeze frame, is mounted on, and extends downwardly from, helicopter 12. Release mechanism 30, illustrated in detail in FIGS. 2 and 3, releasably attaches boom 20 to helicopter chassis 14 and to trapeze frame 24.

As illustrated in FIGS. 2 and 3, frame 24 includes horizontal mounting bars 32 and 34, and upright attachment bars 36 and 38 to attach frame 24 to helicopter 12. A slip tube socket 40 with a vertical conduit is mounted on mounting bars 32 and 34. A hook mount 42 projects outwardly from slip tube socket 40.

Release mechanism 30 is comprised of a vertically oriented connector or slip tube 44 slidable within socket 40, an upper hook 46 mounted on helicopter chassis 14 with hook mount 45 and releasably attachable to the upper end of tube 44, and a lower hook 48 mounted on hook mount 42 of frame 24. Tube 44 includes an upper cylindrical, horizontal hook bar 50 to releasably attach lock 46, and a lower cylindrical, horizontal hook bar 52 to releasably attach lock 48. Bars 50 and 52 are preferably oriented at 90° relative to each other. Circumferential flange 54 extends around tube 44 to limit the upward movement of tube 44 in socket 40. The lower end of tube 44 is attached to the upper end of boom 20 with universal joint 56. Actuator cables 58 and 60 extend from locks 46 and 48, respectively, to actuator levers (not shown) accessible by the helicopter pilot.

In operation, helicopter 12 is flown with trimming apparatus 10 attached by release mechanism 30. If trimming apparatus 10 becomes entangled in tree limbs or other obstacles preventing movement of helicopter 12, the pilot can jettison trimming apparatus 10 by opening hooks 46 and 48. However, trimming apparatus 10 will not be jettisoned if only one hook is opened. Therefore, a safety release that can be quickly actuated is provided, greatly decreasing the likelihood that the boom will be jettisoned due to accidental or panic release, since it will be necessary for the pilot to separately actuate both hooks.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An emergency release mechanism for attaching an external load to a helicopter having a chassis and a downwardly extending frame comprising:

a) a connector having an upper end with a first hook attachment point, a lower end with a load attachment point, and a second hook attachment point;

b) a first release hook mounted on said helicopter chassis and releasably attachable to said first hook attachment point; and c) a second release hook mounted on said frame and releasably attachable to said second hook attachment point, wherein the load is not released unless both hooks are released.

2. The release mechanism of claim 1, wherein said frame includes a sleeve with a vertical conduit, said connector being slidable in said sleeve.

3. The release mechanism of claim 1, said attachment points are horizontal bars.

4. The release mechanism of claim 1, wherein said load attachment point includes a universal joint.

5. The release mechanism of claim 1, wherein said second hook attachment point is intermediate said upper and lower end.

6. The release mechanism of claim 1, wherein said load is a trimming apparatus including a boom with an upper end, said connector lower end being attached to said boom upper end.

7. An emergency release mechanism for attaching an external load to a helicopter having a chassis and a downwardly extending frame with a sleeve having a vertical conduit comprising:

a) a connector vertically slidable within said sleeve, said connector having an upper end with a horizontal first hook attachment bar, a lower end with a load attachment point, and a horizontal second hook attachment bar intermediate said upper and lower end;

b) a first release hook mounted on said helicopter chassis and releasably attachable to said first bar; and c) a second release hook mounted on said frame and releasably attachable to said second bar, wherein the load is not released unless both hooks are released.

8. The mechanism of claim 7, wherein said first and second bars are at a 90° angle.

9. The mechanism of claim 7, wherein said frame includes a horizontal member, said sleeve being attached to said horizontal member.

10. The mechanism of claim 7, wherein said frame sleeve includes a second hook mount, said second hook being mounted on said second hook mount.

11. An airborne tree trimming system comprising:

a) a helicopter having a chassis and a frame extending beneath the helicopter chassis;

b) a trimming apparatus including a boom with an upper end; and c) a release mechanism attaching said trimming apparatus to said helicopter, said release mechanism including a connector having an upper end with a first hook attachment point, a lower end with a boom attachment point, and a second hook attachment point intermediate said upper and lower end; a first release hook mounted on said helicopter chassis and releasably attachable to said first hook attachment point; and a second release hook mounted on said frame and releasably attachable to said second hook attachment point, wherein the load is not released unless both hooks are released.

12. The system of claim 11, wherein said frame includes a sleeve with a vertical conduit, said connector being vertically slidable in said sleeve.

13. The mechanism of claim 12, wherein said frame includes a horizontal member, said sleeve being attached to said horizontal member.

14. The mechanism of claim 12, wherein said frame sleeve includes a second hook mount, said second hook being mounted on said second hook mount.

15. The system of claim 12, wherein said connector includes a flange limiting upward movement of said connector in said sleeve.

16. The system of claim 11, said attachment points are horizontal bars.

17. The system of claim 16, wherein said bars are at a 90° angle.

18. The system of claim 11, wherein said load attachment point includes a universal joint.

19. The system of claim 11, wherein said trimming apparatus includes a plurality of rotatable cutting blades mounted on said boom, said blades being vertically aligned in a vertical plane.

20. The system of claim 11, further including a universal joint attaching the lower end of said connector to said boom upper end.

* * * * *